April 29, 1930. J. PICCOLO ET AL 1,756,471
CONFECTION COATING APPARATUS
Filed May 21, 1927
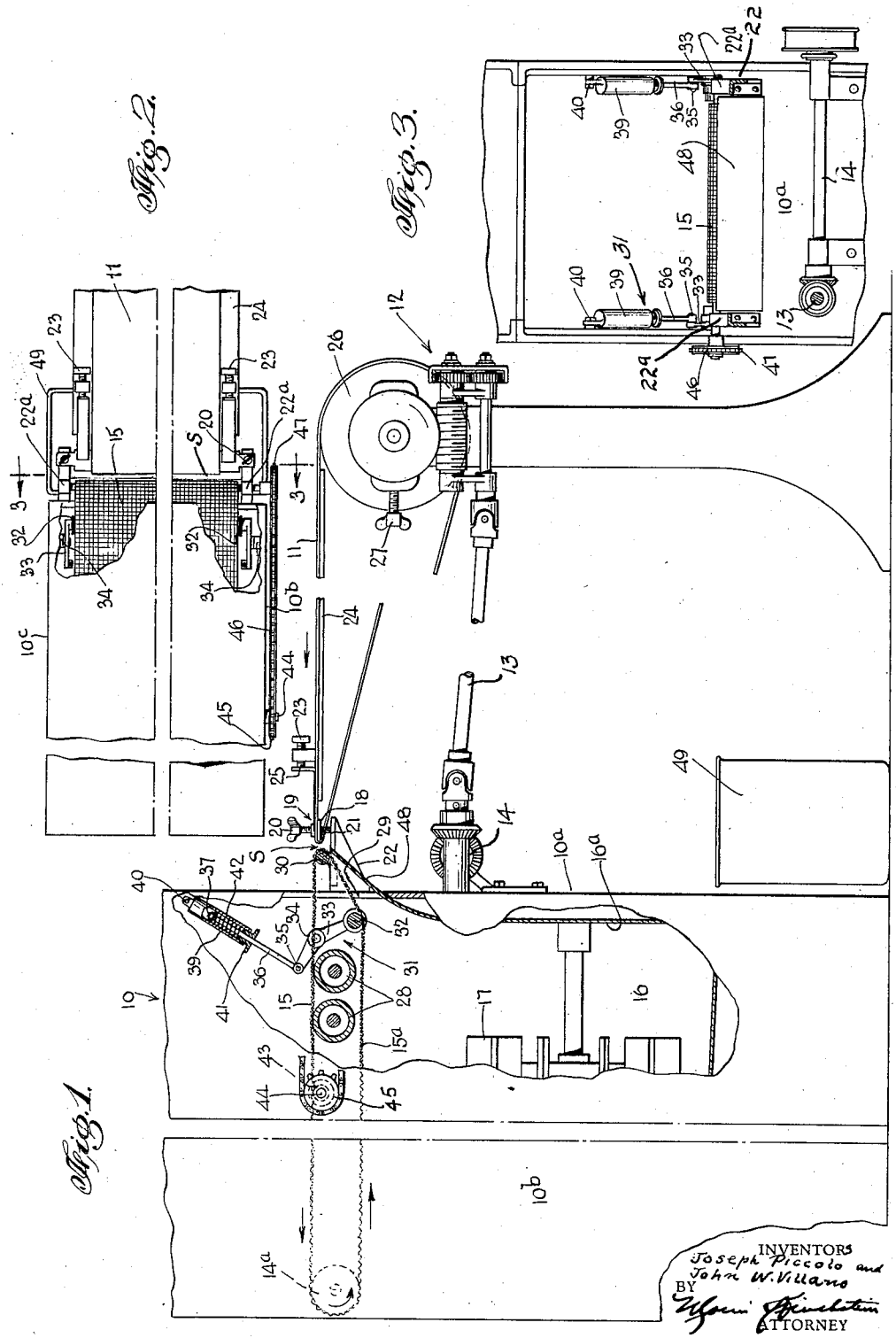
INVENTORS
Joseph Piccolo and
John W. Villano
BY
ATTORNEY Patented Apr. 29, 1930

1,756,471

UNITED STATES PATENT OFFICE

JOSEPH PICCOLO AND JOHN W. VILLANO, OF BROOKLYN, NEW YORK

CONFECTION-COATING APPARATUS

Application filed May 21, 1927. Serial No. 193,213.

This invention relates to confection coating apparatus and more particularly is directed to improvements in the apparatus for feeding the uncoated product to the coating machine.

In the handling of cut candy bars, and the like before admission to the enrober of confection coating machinery, particles of the material usually adhere to the cut bars and are carried therewith into the enrober to be washed by the coating material down into the reservoir from which the coating supply is pumped. The particles together with the coating material are deposited upon the cut bars, thus producing an unevenly appearing coat. Strainers have been employed to remove these particles but these have proved ineffective and inefficient, and it is the object of this invention to provide a practical construction whereby the necessity for the use of strainers is obviated by eliminating the possibility of the entrance of the débris into the apparatus.

Another object of this invention is to simplify the delivery means of candy coating apparatus in order to eliminate a multiplicity of supports and adjusting means therefor.

A further object of the invention is to provide an arrangement of the feeding mechanism for the candy coating machine and the machine itself whereby the operation of the machine itself is made more efficient with resultant improvement in the produce over products of machines heretofore in use.

An additional purpose of the device is to provide means to prevent the introduction of impurities ordinarily found in the bath of coating material in such coating machines.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a side elevation of an embodiment of the invention, with portions broken away;

Fig. 2 is a plan of coating apparatus and the associated delivery belt therefor; and Fig. 3 is a front elevation of the enrober, viewed from line 3—3.

On the drawings, 10 indicates the candy coating apparatus generally known as the enrober having walls 10$^a$, 10$^b$ and 10$^c$ to which the candy is fed by an automatic feed table 24 including the conveyor belt 11 driven by an assemblage of pulleys and gears 12, well known in the art and not forming any part of this invention. This assemblage derives its power from a shaft 13, which is connected directly to the shaft 14 driving the moving parts of the enrober hereinafter described.

In the enrober 10 is provided the customary foraminated or perforated belt 15, generally of wire construction, which receives the candy or other material to be coated and carries it past the curtain of chocolate or other coating material produced by means not shown. Excess of the chocolate drains down through the belt to a reservoir 16 of the ordinary construction in which is placed an agitator 17 of the type generally used for this purpose.

Conveyor belt 11 is provided at the delivery end 19 thereof with the customary bar 18 over which the belt passes for delivering the material to be coated directly to the perforated belt 15 of the enrober. For allowing proper positioning of the said delivery end 19, a leveling screw 20 is provided for bar 18, the end of the screw 20 bearing against an extension 21 on bracket 22 which is fixedly attached to the enrober 10. For shifting the horizontal position of the belt 11, the adjusting screw 23 is associated with a fixed point on the table 24 carrying the belt 11. By means of the upturned arm 25 made a part of the bar 18, the position of bar 18 with respect to the belt 15 may be fixed. For the tail pulley 26 of the assemblage 12 a tension adjusting device 27 is supplied to allow adjustment of the belt 11 at the point of entrance to the enrober 10.

The perforated belt 15 is driven by the end pulley 14ª which rotates in the direction indicated by the arrow thereon and which usually is driven by means connected to the same drive that supplies power to shaft 14. From pulley 14ª, the lower section 15ª of belt 15 passes under roller 32 supported in a manner hereinafter described and then through opening 29 formed in end wall 10ª of the enrober which end wall terminates below the belt level. Bracket 22 is located immediately below opening 29 and carries bearings 22ª for roller 30. From roller 32, the belt after passing out of the enrober through opening 29 travels over roller 30.

From roller 30, the upper section of the belt travels to the station where the coating material is applied, at which station the belt is supported in the customary manner upon the two rollers 28. From rollers 28 the belt travels over idler 43 and thence over end pulley 14ª.

The roller 30 for belt 15 and bar 18 are so relatively adjusted that a space S is provided therebetween sufficient to allow any particles riding on belt 11 with the cut bars, or loosely adhering to the bars themselves, to fall down and away from belt 15 to be received in a receptacle 49 or other means provided for the collection thereof.

In order to keep the perforated belt 15 under proper tension, the belt tightener assemblies 31 are provided in which roller 32 is rotatably carried by links 33, one at each end of the roller 32, each lever being pivoted in a bearing 34 in the wall of the enrober or at some other fixed point. Connected rotatably at 35 to link 33 is a plunger arm 36 carrying at its extreme end a presser end 37 reciprocating within a hollow cylinder 39 which is pivotally connected at a fixed bearing point 40 on the enrober 10. Compressed between presser end 37 and a bushing 41 adjustably connected to cylinder 39 is a spring 42 ordinarily tending to force end 37 toward bearing point 40 and thereby move roller 32 in a clockwise direction (see Fig. 1) to contact with belt 11 and thereby place it in tension.

The idler 43 ordinarily provided for the enrober belt 15 in this construction is extended through one wall of the enrober 10, as shown at 44 and by means of a sprocket wheel 45 fixed to said extension, a positive chain drive for roller 30 is assured through the coacting chain 46 and a sprocket 47 fixed to an extension of the roller 30. By means of this construction, an even displacement of the belt between the roller 30 and idler 43 is assured. The idler 43 thus constitutes a tightening roller.

The lower section 15ª of the perforated belt 15 traveling toward roller 31 receives the drainage of coating material from above and tends to carry material out of the enrober 10 which would thereafter drip upon the floor, etc. To prevent such unclean conditions and the loss of material used in the process, a drip plate 48 is provided, as shown in Fig. 1 forming an extension of wall 16ª and extending the entire width of belt 15 and spaced horizontally from roller 30 and the belt but is not close enough to belt 11 to receive any of the crumbs or other débris falling therefrom.

In the ordinary use of the device, candy cut to proper size is received upon the conveyor belt 11 and carried to delivery end 19 which has previously been adjusted by means of levelling screw 20, the horizontal adjusting screw 23 and the adjusting device 27 to bring the discharge end of belt 11 in proper relation to the perforated belt 15. At the delivery end 19, the material to be coated slides over the space there provided, onto belt 15 and is then carried into the enrober where the proper coating material is pumped, or allowed to pour down upon the candy. Excess coating material drains back to reservoir 16 over the belt 15, as it moves toward roller 30. Plate 48 carries back to reservoir 16 any of the coating material which fails to drain through belt 15 before it passes out of the enrober.

It is a well known fact in the art that the grinding action of the particles carried over into the moving parts of the machine is tremendous, especially where coatings having sugar as one of their components is used. The crystals of sugar are very abrasive so that disastrous wearing of the machine parts takes places in bearings and the like where crystallization takes place. The elimination of the débris in the delivery from the feed table 24 to the enrober belt 15 does away with this defect in operation.

The construction of this improvement is such that by slight structural changes, the present standard apparatus may be modified to carry out the novel purposes of the invention.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described our invention, we claim as new and desire to secure by Letters Patent:—

1. In confection coating apparatus, the combination of an enrober having an opening in a wall thereof, a perforated belt in said enrober, a roller supported externally of said enrober adjacent said opening, said perforated belt passing through said opening around said roller and back into the enrober, and a feed table for material to be coated, the end of said table being located in line with said roller but horizontally spaced therefrom, to permit particles from the material to be coated to fall from the end of the feed table without touching said belt or drop into said enrober.

2. In confection coating apparatus, the combination of an enrober having an opening in a wall thereof, a bracket fixed to said wall at said opening, a roller carried by said bracket, a feed table for material to be coated, the end of said table being located in line with said roller, a level adjusting member carried by said table and cooperating with said bracket member, the end of said table adjacent said roller being substantially spaced from said roller in a horizontal direction to provide an opening, means for adjusting the longitudinal position of said end, and a perforated belt for said enrober passing through said opening and around said roller, whereby only material to be coated may pass from said table to said belt, and waste material is discarded.

3. In a set-up of confection coating apparatus, including an enrober, a perforated belt overlying said enrober, and a feed table for delivering uncoated confections to the enrober, the delivery end of the table being located in line with the receiving end of said perforated belt, said ends being substantially spaced in a horizontal direction, said entire space between said ends being located beyond said enrober whereby particles from said uncoated confections will fall without entering said enrober or coming into contact with said belt.

4. In confection coating apparatus, in combination an enrober, a perforated belt in said enrober extending beyond said enrober, and a drip plate located below the extended portion of said belt forming an extension of said enrober, and a table for feeding objects to be coated to said belt, the adjacent portions of said table and belt being spaced to permit loose particles of said objects to fall thru said space without entering said enrober.

5. In confection coating apparatus, an enrober, a perforated belt in said enrober, said perforated belt extending beyond said enrober, a drip plate located below the extended portion of said belt forming an extension of the lower edge of said opening, and a table substantially in line with said perforated belt for feeding objects to be coated to said belt, the delivery end of said table being spaced from said extended portion and said drip plate to permit particles on said objects to fall thru said space without entering said enrober.

6. In confection apparatus, an enrober, a perforated carrier belt therefor, a roller carrying said belt, an idler for said belt, means for driving said belt and positive drive means interconnecting said roller and said idler for tightening said belt.

In testimony whereof we affix our signatures.

JOSEPH PICCOLO.
JOHN W. VILLANO.